C. O. PECK.
FLOUR AND MEAL SIFTER.
No. 187,307. Patented Feb. 13, 1877.
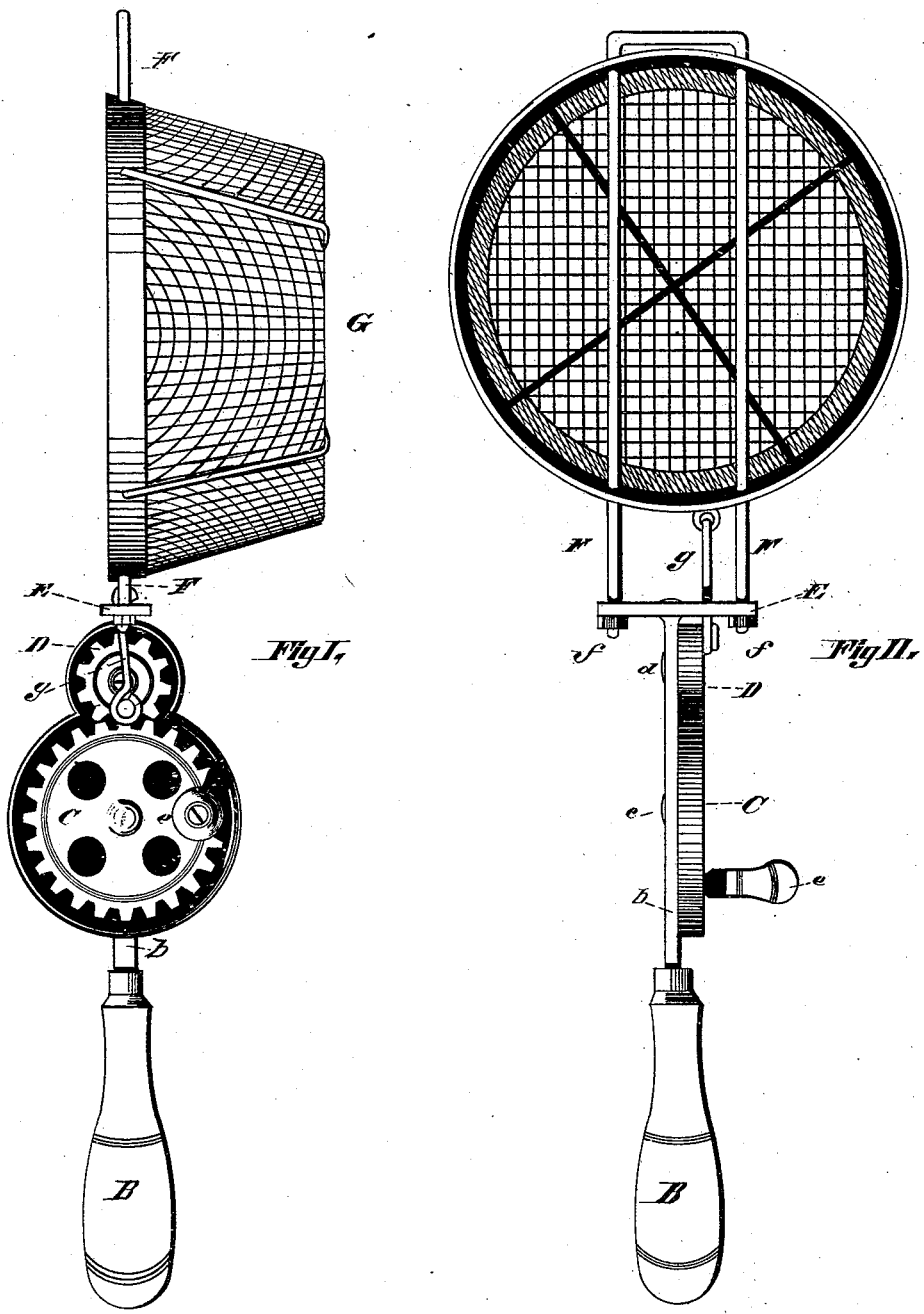

UNITED STATES PATENT OFFICE

CHARLES O. PECK, OF PITTSFIELD, MASSACHUSETTS.

IMPROVEMENT IN FLOUR AND MEAL SIFTERS.

Specification forming part of Letters Patent No. 187,307, dated February 13, 1877; application filed December 26, 1876.

*To all whom it may concern:*

Be it known that I, CHARLES O. PECK, of Pittsfield, Berkshire county, State of Massachusetts, have invented an Improved Sifter for Flour and Meal, of which the following is a specification:

The nature and objects of my invention are fully illustrated in the accompanying drawings, of which Figure I is a side view, and Fig. II a plan or top view.

To the shank *b* of the handle B are attached the gear-wheel C and pinion D, by means of the rivets *c d*, that, in holding them to the rod *b*, form their bearings. The rod *b* is prolonged clear of the pinion D, to be connected by means of the cross-head E to the ends of rods F F, which rods support and guide the cup-shaped sieve G by passing through its rim. The sieve G is connected by the link *g*, which forms a crank-arm to the spur-wheel D, as shown in Fig. I, and, as seen in Fig. II, the sieve G is free to reciprocate upon its guides and supporters F F, when it is put in motion by the revolution of the wheel D, through the movement of wheel C by means of its handle *e*. The wheels C D are completely protected by being incased upon two sides by a cover rigidly attached to the rod *b*, and in which they are free to rotate, so that they may not be injured by a blow or fall.

In operation the handle B is grasped by one hand, while the other turns the handle *e* to reciprocate the sieve G. The cup-shaped sieve G and prolonged handle together form a scoop, to enable the sifter to be self-filled, while the wheels are protected from flour or meal during the act.

I have multiplied the motion through the pinion, as the rapid motion thus given to the sieve is admirably adapted to the purpose to be subserved.

The rods F F have their ends pass through the cross-head E, where they are secured by nuts *f f*, and the link *g* is attached to the sieve G by being hooked to a staple therein, so that, by simply removing the nuts from the ends of the bars F F, they may be readily withdrawn from the sifter G when the link *g* is unhooked, and any number of sifters may be packed for transportation in small space when thus taken to pieces.

Now, having described my invention, what I claim is—

A combined scoop and sifter, consisting of the supporting-handle B *b*, gearing C D, guiding-rods F F, crank-arm or link *g*, and reciprocating bowl and sieve G, suspended from and reciprocating upon the rods F F, all as set forth.

CHAS. O. PECK.

Witnesses:
 WM. T. FILLEY,
 C. P. LAPHAM.